US012652243B2

(12) United States Patent
Karki et al.

(10) Patent No.: US 12,652,243 B2
(45) Date of Patent: Jun. 9, 2026

(54) VIRTUAL LOCAL AREA NETWORK (VLAN) SUPPORT, INCLUDING PRIVATE VLAN (PVLAN) SUPPORT IN ASSOCIATION WITH MEDIA ACCESS CONTROL (MAC) BASED VLAN ASSIGNMENT

(71) Applicant: Arista Networks, Inc., Santa Clara, CA (US)

(72) Inventors: Siddarth Karki, Bangalore (IN); John William French, Pacifica, CA (US); Manish Singhvi, Bengaluru (IN); Kaustav Majumdar, Bangalore (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 66 days.

(21) Appl. No.: 18/672,405

(22) Filed: May 23, 2024

(65) Prior Publication Data

US 2025/0365230 A1    Nov. 27, 2025

(51) Int. Cl.
| | |
|---|---|
| *H04L 45/586* | (2022.01) |
| *H04L 12/46* | (2006.01) |
| *H04L 45/76* | (2022.01) |

(52) U.S. Cl.
CPC ........ *H04L 45/586* (2013.01); *H04L 12/4675* (2013.01); *H04L 45/76* (2022.05)

(58) Field of Classification Search
None
See application file for complete search history.

(56) References Cited

U.S. PATENT DOCUMENTS

| | | | | |
|---|---|---|---|---|
| 6,678,241 B1 * | 1/2004 | Gai | ..................... | H04L 12/4641 |
| | | | | 370/216 |
| 6,813,250 B1 * | 11/2004 | Fine | ..................... | H04L 45/023 |
| | | | | 370/402 |
| 7,194,622 B1 * | 3/2007 | Halasz | .................. | H04L 9/0822 |
| | | | | 380/247 |
| 7,385,973 B1 * | 6/2008 | Johnson | .............. | H04L 12/4675 |
| | | | | 370/389 |
| 7,599,283 B1 * | 10/2009 | Varier | ..................... | H04L 45/00 |
| | | | | 370/254 |

(Continued)

FOREIGN PATENT DOCUMENTS

| | | |
|---|---|---|
| CN | 102833366 | 12/2012 |
| CN | 106789531 | 5/2017 |

(Continued)

OTHER PUBLICATIONS

Extended European Search Report issued in related European Patent Application No. 25175967.6 mailed Sep. 22, 2025 (9 pages).

*Primary Examiner* — Phyllis A Book
(74) *Attorney, Agent, or Firm* — Sprinkle IP Law Group

(57) ABSTRACT

Network devices and methods for their operation are disclosed whereby embodiments may allow a trunk port on the network device to behave as an access port with respect to conforming with the standards of Virtual Local Area Networks (VLANs), including Private VLANs (PVLANs). In this manner PVLANs can be supported on ports that are associated with multiple untagged VLANs, such as when using Media Access Control (MAC) based VLAN assignment (MBVA) with those ports.

20 Claims, 5 Drawing Sheets

(56) References Cited

U.S. PATENT DOCUMENTS

| | | | | |
|---|---|---|---|---|
| 7,877,483 | B1 * | 1/2011 | Finn | H04L 12/4641 |
| | | | | 709/227 |
| 2003/0189905 | A1 | 10/2003 | Lee | |
| 2006/0248229 | A1 * | 11/2006 | Saunderson | H04L 61/5014 |
| | | | | 709/245 |
| 2007/0140147 | A1 * | 6/2007 | Touve | H04L 45/48 |
| | | | | 370/255 |
| 2008/0031261 | A1 * | 2/2008 | Addeo | H04L 12/4675 |
| | | | | 370/395.53 |
| 2008/0101387 | A1 * | 5/2008 | Wackerly | H04L 12/4645 |
| | | | | 370/392 |
| 2013/0024692 | A1 * | 1/2013 | Volpano | H04L 63/08 |
| | | | | 713/168 |
| 2013/0201978 | A1 * | 8/2013 | Lyer | H04L 67/14 |
| | | | | 370/338 |
| 2014/0050077 | A1 * | 2/2014 | Kasat | H04L 12/4641 |
| | | | | 370/216 |
| 2014/0341221 | A1 * | 11/2014 | Kommula | H04L 63/0272 |
| | | | | 370/392 |
| 2015/0109924 | A1 * | 4/2015 | Agarwal | H04L 12/1886 |
| | | | | 370/235 |
| 2016/0285647 | A1 * | 9/2016 | Grosser | H04L 12/4666 |
| 2016/0350151 | A1 * | 12/2016 | Zou | H04L 67/61 |
| 2019/0104091 | A1 * | 4/2019 | Hooda | H04L 12/4641 |
| 2019/0379598 | A1 * | 12/2019 | Johnsen | H04L 41/0816 |
| 2022/0263821 | A1 | 8/2022 | Sharma et al. | |
| 2024/0275636 | A1 * | 8/2024 | Wang | H04L 12/4641 |

FOREIGN PATENT DOCUMENTS

| | | | | | |
|---|---|---|---|---|---|
| KR | 20230055132 A | * | 4/2023 | | H04L 12/4641 |
| WO | WO-2022255930 A1 | * | 12/2022 | | H04W 40/246 |

* cited by examiner

502 REVIEW CANDIDATE PORT

504 REVIEW CANDIDATE VLAN

506 IS THE CANDIDATE VLANS PRIMARY VLAN IN THE ALLOWED VLAN LIST FOR THE CANDIDATE PORT?

YES

NO

508 IS THE CANDIDATE VLAN A PRIMARY VLAN TO ANY VLAN IN ALLOWED VLAN LIST FOR THE CANDIDATE PORT?

YES

NO

510 PORT IS NOT MEMBER OF VLAN

512 PORT IS MEMBER OF VLAN

VIRTUAL LOCAL AREA NETWORK (VLAN) SUPPORT, INCLUDING PRIVATE VLAN (PVLAN) SUPPORT IN ASSOCIATION WITH MEDIA ACCESS CONTROL (MAC) BASED VLAN ASSIGNMENT

BACKGROUND

In traditional networking environments, local area networks (LANs) are segmented physically using switches or routers. Logical segmentation within a network arose to enhance security, manageability, and efficiency in networked environments. Virtual LANs (VLANs) logically partition a network into multiple virtual networks.

In contemporary network environments, the integration of robust security measures alongside efficient management of network traffic and resources is essential. Thus, one aspect of network management in secure environments is the dynamic assignment of devices to appropriate VLANs based on their identity or authentication status.

Accordingly, an authentication framework may be leveraged to assign devices to VLANs in a network. For example, MAC-based VLAN assignment (MBVA) is a method used in networking to assign VLAN memberships to devices based on their MAC (Media Access Control) addresses. MBVA allows multiple traffic sources (e.g., on the same port of a network device) to be placed on different VLANs.

Another security measure that may be put in place in a network is the use of Private VLANs (PVLANs). PVLANs provide an additional layer of segmentation within VLANs. In a traditional VLAN, all devices within the same VLAN can communicate freely. However, in environments requiring stricter isolation, PVLANs allow further subdivision of VLANs into smaller, restricted domains. Thus, from a security perspective, certain types of networks would benefit from utilizing both PVLANs and MBVA in tandem.

What is desired, therefore, is the ability to simply and easily implement PVLANs on a network device in association with MBVA especially in scenarios where multiple VLANs may be assigned to devices on a port of that network device.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
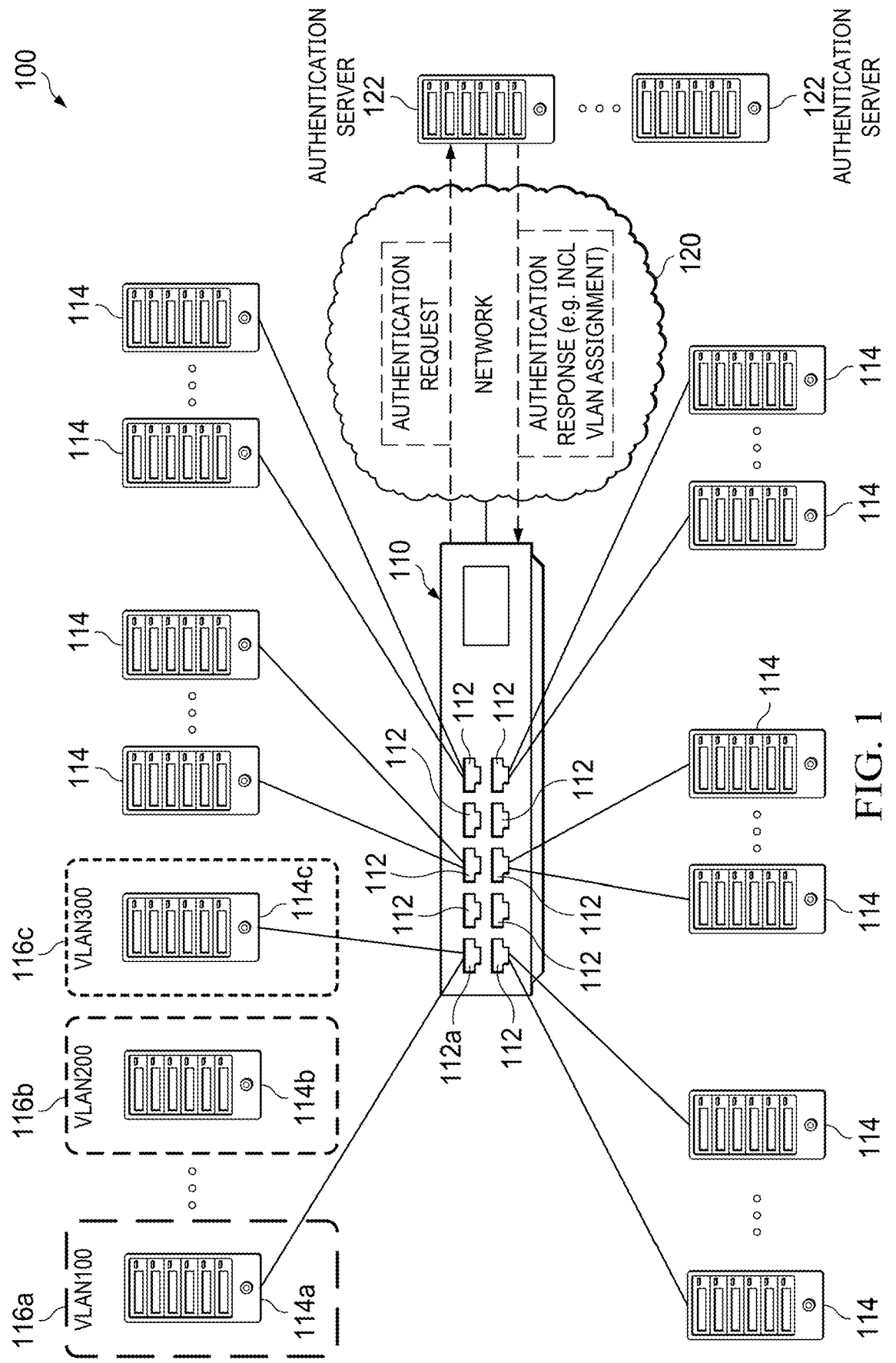
FIG. 1 is a block diagram illustrating a network environment including an embodiment of a network device and authentication servers.

As discussed, in traditional networking environments, local area networks (LANs) are segmented physically using switches or routers. Each segment operates as an independent broadcast domain. However, the need for logical segmentation within a single physical network infrastructure arose to enhance security, manageability, and efficiency in networked environments.

Virtual LANs (VLANs) address this need by logically partitioning a single physical network into multiple virtual networks. Each VLAN operates as a separate broadcast domain, allowing for independent configuration and management. Devices within the same VLAN can communicate with each other as if they were on the same physical network, irrespective of their physical location. This logical separation improves network security, enhances traffic management, and facilitates network scalability.

VLAN membership for network devices may be identified using VLAN tags. In tagged VLAN configurations, each network frame includes a VLAN tag indicating the VLAN to which the frame belongs. This tagging method is commonly used in environments where devices connect to VLAN-aware networking equipment, such as managed switches. Conversely, untagged VLANs do not include VLAN tags in network frames. Devices connected to untagged VLANs are typically unaware of VLAN membership and rely on the configuration of the network infrastructure to determine VLAN association. In certain scenarios multiple VLANs may thus be configured for a given port on a network device. These ports are usually referred to as trunk ports.

In contemporary network environments, the integration of robust security measures alongside efficient management of network traffic and resources is essential. In particular, it is typically the case that VLAN assignment has been performed using methods such as port-based assignment or static assignment based on IP addresses. However, these methods may not effectively cater to the stringent security requirements of modern networks, particularly in scenarios where unauthorized devices attempt to gain network access or where devices dynamically change their network locations. Thus, one aspect of network management in secure environments is the dynamic assignment of devices to appropriate VLANs based on their identity or authentication status.

To give an example, one type of networked environment in which increased security may be desired is referred to as a "campus" environment. A campus network can be thought of as a proprietary LAN (or set of interconnected LANs) serving a university, corporation, government agency, or other organization or entity. Oftentimes in these sorts of network environments users desire to join, or access, the campus network, and do so through a network device in the campus network. For example, users in a conference room or classroom may access a campus network through a wired or wireless interface provided by a network device in the network. In such a campus environment, there are thus myriad devices which can connect to the network. Network devices comprising the infrastructure of campus networks (e.g., switches or the like) need to be able to classify these devices and forward their traffic appropriately. For certain devices (e.g., IP based phones), this is of particular importance as certain types of traffic (e.g., voice traffic or signaling) need to be treated with priority over generic traffic to ensure quality of service and minimum loss.

In these types of scenarios, the network typically has some form of authentication or validation in place. This authentication can be done using authentication, authorization, and accounting (AAA), a widely used standard-based framework for controlling who is permitted to use network resources (through authentication), what they are authorized to do (through authorization), and capturing the actions performed while accessing the network (through accounting). Hosts (e.g., users at host devices) may thus access the (e.g., campus) network through a network device (e.g., a router or switch) serving as an authenticator. The network device can authenticate the host device using the authentication server based on credentials provided by the host device and allow, block, or otherwise control network traffic between the host and the campus network based on the result of the authentication.

In particular, many of these networks may authenticate users according to IEEE 802.1X, an authentication protocol to allow access to networks using an authentication server. 802.1X provides an authentication framework that enables devices to authenticate themselves before being granted access to the network. Remote Authentication Dial-In User Service (RADIUS) is one example of a protocol that can be used by such an 802.1X authenticator to validate a user (referred to as an 802.1X supplicant, or just supplicant) by communicating with an AAA server (the RADIUS server) in a 802.1X topology. Additionally, other authentication frameworks may be used such as captive portal authentication, which may add other layers of authentication (e.g., over 802.1X/MBA) where a user may be asked to enter some credentials or comply with some policy.

An authentication framework may be leveraged to assign these devices to VLANs in the campus network. Specifically, MAC-based VLAN assignment (MBVA) is a method used in networking to assign VLAN memberships to devices based on their MAC (Media Access Control) addresses. MBVA allows multiple untagged traffic sources (e.g., on the same port) to be put on different VLANs (e.g., the port is a trunk port). The untagged VLANs include a single native VLAN and the other untagged VLANs.

Accordingly, by leveraging 802.1X in conjunction with MBVA, network administrators of campus networks can enforce granular access policies and dynamically assign VLANs based on the identity of the connecting devices. Specifically, the use of 802.1X in association with MBVA may allow for dynamic VLAN assignment based on authentication results. Once a device successfully authenticates via 802.1X (or fails such authentication), the authentication server can provide instructions to the network device (e.g., switch) regarding which VLAN the authenticating device should be assigned to based on its MAC address or user credentials.

By integrating 802.1X with MBVA, network administrators can enforce more stringent security policies. Devices are not only required to authenticate themselves but can also be dynamically placed into VLANs based on their MAC addresses and user identities. For example, in certain networks that include IP based phones, MAC-to-VLAN assignment may be performed when any of the following occurs: 1) a device is detected as a phone (e.g., via LLDP or another source and a phone VLAN is configured (or dynamically learned via RADIUS)), 2) a dynamic VLAN is assigned from RADIUS when the device is authenticated, 3) a static VLAN is utilized for a device, 4) a device fails authentication and an authentication fail VLAN is configured or 5) the authentication server is unavailable and an (e.g., MBVA based) VLAN may be assigned as a fallback (other examples are of course possible). This enables finer-grained control over network access and segmentation.

Thus, in campus environments (and other scenarios) trunk ports which have the capability to carry multiple (e.g., untagged) VLANs via MBVA are widely used to connect to end devices such as phones, laptops or servers. While the use of MBVA and VLANs in these types of network environments may provide a certain level of security, it may also be desired to implement other security measures in these contexts. One of these security measures may be the implementation of Private VLANs (PVLANs) in association with such networks. PVLANs provide an additional layer of segmentation within VLANs. In a traditional VLAN, all devices within the same VLAN can communicate freely. However, in environments requiring stricter isolation, PVLANs allow further subdivision of VLANs into smaller, restricted domains. Thus, in the case of a trunk port where multiple VLANs (e.g., PVLANs) have been implemented, these multiple VLANs may include a primary VLAN that is the default VLAN for the port (and is the VLAN to which untagged traffic arriving on the port is assigned), along with a number of secondary VLANs. In a PVLAN implementation these secondary VLANs may be isolated VLANs where devices cannot communicate with other devices in the same VLAN or any other (e.g., secondary) VLAN, or may be community VLANs where devices on the community VLAN may communicate with other devices in the community VLAN.

Accordingly, from a security perspective certain types of networks (e.g., campus networks) would benefit from utilizing both PVLANs and MBVA (e.g., on the same trunk port). PVLANs, however, are typically meant to be utilized on ports that connect to end devices (e.g., access ports), and may be difficult to implement on trunk ports of a network device. What is desired, therefore, is the ability to implement PVLANs on trunk ports of a network device (e.g., ports where multiple untagged VLANs are employed) as if those ports were access ports.

To address those desires, among others, embodiments of network devices and methods for their operation are disclosed whereby embodiments may allow a trunk port to behave as an access port with respect to conforming with the standards of PVLANs. In this manner PVLANs can be supported on ports that are associated with multiple untagged VLANs, such as when using MBVA with those ports. In particular, trunk ports (e.g., where MBVA is being utilized) may be handled in the same manner (e.g., with respect to association of that port with VLANs in the network) as an access port would in cases where a device belonging to any of the configured PVLANs existed on that access port. For example, if there are multiple devices on a trunk port with MBVA enabled, (where each of these devices may or may not belong to different VLANs in accordance with MBVA supporting multiple untagged VLANs on the port), and if any one of these devices belong to an (e.g., isolated) PVLAN, then this port will conform to the PVLAN standards of behaving as an isolated port (e.g., it will not receive traffic from any other isolated or community PVLAN ports and the devices on the port will be able to communicate with other primary PVLAN ports only).

In this manner, embodiments may allow multiple configurations of trunk ports to work in association with PVLANs, including where all VLANs associated with the port are untagged, all VLANs are tagged, all VLANs except a certain VLAN on the port are tagged and where all VLANs associated with the port are untagged except another VLAN associated with the port.

To achieve this functionality, embodiments may promote (i.e., associate) ports of a network device with VLANs based on triggering events, such as a static or dynamic configuration change. These configuration changes may include when a ports' VLAN membership changes, such as when a user interacts with an configuration interface (e.g., a command line interface) to change a configuration associated with a port's VLAN membership (e.g., changing native VLANs, VLAN assignments, creating new VLANs, deleting VLANs, etc.), or when a device authenticates into the port dynamically via 802.1X (e.g., when a VLAN assignment is sent from a RADIUS server or from another source).

To illustrate in more detail, according to certain cases (noting that there can be more than one secondary VLAN, and notwithstanding traffic directionality) for any given primary/secondary VLAN pairing, PVLAN separation usually comprises asymmetric traffic flow, accomplished by maintaining two different floodsets (lists of ports to which to replicate Broadcast, unknown-unicast and multicast traffic (BUM) traffic), one (with both primary ports and "promoted" secondary ports) for traffic ingressing on primary ports, and one (in the case of isolated secondary VLANs, with only primary ports) for traffic ingressing on secondary ports. So, traffic ingressing on a primary port can go everywhere, and traffic ingressing on a secondary port can only go to primary ports. So promoting a port may include associating the port with (e.g., adding it to) a floodset of a primary VLAN.

As will be noted, then, a network device may maintain configured VLANs, ports configured for those VLANs, whether those VLANs are primary or secondary VLANs, whether those VLANs are PVLANs, whether secondary VLANs are isolated or community VLANs or other VLAN configuration data. Additionally, to facilitate promotion of ports in association with trunk ports on which MBVA is enabled, embodiments may maintain a set of data for each VLAN and each port (e.g., associated with that VLAN). This data may include an allowed traffic direction (allowedTrafficDirection) This allowed traffic direction signifies, for a given port, which direction the traffic belonging to an associated VLAN can be allowed to flow. This allowed traffic direction can have three possible values: ingress, egress, or both. If the value is ingress, only ingress traffic is allowed. For example, if a given network device is in a VLAN where the traffic direction is only ingress, it can send traffic into the port, but no other traffic belonging to this VLAN will ever come out of the port. If the value is egress, only egress traffic is allowed, if a given device is in a VLAN where the traffic direction is only egress, it cannot send traffic into the port, but can receive traffic belonging to the VLAN coming out of the port. If the value is both (ingressAndEgress) traffic for that VLAN may flow freely into and out of the port.

In certain embodiments, part of the data that may be maintained for ports in association with a VLAN may be a promoted port indicator (promotedPort). This promoted port indicator may be a PVLAN specific attribute signifying whether the VLAN is allowed on the port because that port has been promoted. In other words, a promoted port indicator may indicate whether that port was promoted to a corresponding VLAN or whether that port inherently belonged to that VLAN (e.g., was configured for, or otherwise assigned to, that VLAN).

In some cases, tag on egress data (tagOnEgress) may be kept for a port and VLAN, where this attribute signifies whether traffic going out of a port belonging to this VLAN would be tagged with a VLAN tag. As certain embodiments may pertain to ports on which MBVA is enabled with multiple untagged VLANs, tag on egress data may always be set to false on those ports.

For trunk ports on the switch, an allowed VLAN list (trunkAllowedVlan) may also be maintained. This list comprises a list of the allowed VLANs on an associated trunk port. This list may be populated based on static or dynamic configuration of VLANs on the device. An example of how this list is populated would be when a device dynamically authenticates on a port via 802.1X and receives a VLAN from the RADIUS server, consequently, the VLAN received from the server is added to this trunkAllowedVlan list. Another example of a dynamic configuration of VLANs (e.g., which may be used to create, modify, or update a allowed VLAN list), might be through various dynamic configuration interfaces such as through an OpenConfig gNMI interface (e.g., whereby dynamic states for VLANs on a trunk port can be configured using a gNMI connection with a network device using an OpenConfig model), or by software process on the device using libraries or other functions provided by a Software Development Kit (SDK) on the network device can directly set the state for VLANs on trunk ports. VLANs configured for various ports in these ways may also be added to the trunkAllowedVlan list for those ports. Other ways in which an allowed VLAN list for a port may be populated is through a static configuration received through (e.g., command line) user interfaces such as configuring the native VLAN on a trunk port using those user interfaces or configuring the allowed VLAN list statically on a trunk port or almost any other manner of obtaining such information.

Accordingly, when a triggering event occurs with respect to a network device (e.g., ports of VLANs thereon), the ports of the network device may be evaluated with respect to VLANs on that network device to determine if any of the ports should be promoted for those VLANs by associating those ports with those VLANs such that traffic from those VLANs can flow across those ports. In some cases, the ports evaluated may be limited to trunk ports on which MBVA is enabled.

Triggering events may be static or dynamic events such as, for example, a configuration change for the VLAN received through an interface of the network device, an addition of the VLAN to a configuration of the network device (e.g., received through an interface of the device), or a change in a membership of the port or the VLAN at the network device. A change in membership of a port of the network device may be caused, for instance, by a device authenticating on the port and being assigned the VLAN from an authentication server or through other configuration changes associated with VLANs being allowed for ports as discussed herein (e.g., dynamic configuration through a gNMI interface or SDK provided by a network device, or through a static configuration change provided through a user interface, etc.)

When it is determined that a triggering event has occurred for a port of the network device (e.g., wherein MBVA is enabled on the port and multiple VLANs are assigned to the port), the port can be evaluated with respect to the VLANs configured at the network device to determine if the port should be promoted with respect to any of those VLANs. Specifically, in certain embodiments, for a port, each VLAN on the network device may be iterated through. For a particular VLAN when it is determined the port is not assigned to that VLAN and that the port is a member of the VLAN, the port may be promoted with respect to that VLAN.

The determination that the port is a member of the VLAN may be based on the maintained set of allowed VLANs for that port (e.g., trunkAllowedVlan). Specifically, determining that the port is a member of the VLAN may include determining that a primary VLAN of that VLAN is in the set of allowed VLANs for the port, or that the VLAN is a primary VLAN to at least one VLAN in the set of allowed VLANs for the port.

The promotion of the port may include setting a promoted port indicator or flag (promotedPort) with respect to that port and that VLAN. Furthermore, when the port is promoted a traffic direction for the port may be determined for that VLAN and the determined traffic direction associated with the port and that VLAN (e.g., allowedTrafficDirection). This traffic direction may be, ingress, egress, or both (ingressAndEgress) and may be determined based on a type of the VLAN (e.g., whether the VLAN is a primary, community or isolated VLAN).

Turning then to FIG. 1, network environment 100 includes an embodiment of a network device 110 utilized to provide PVLAN support in the network environment 100. Network device 110 (such as a switch or a router) comprises a plurality of network interfaces (i.e., ports) 112 to which hosts 114 are connected (e.g., through a wired or wireless connection) to access network 120. Network device 110 controls the flow of packets from hosts 114 into and out of network device 110 and onto network 120. Certain ports 112 of network device 110 may be utilized as trunk ports such that hosts 114 on those trunk ports may be assigned to multiple different VLANs 116. For example, port 112a may be a trunk port whereby host 114a connected to port 112a may be assigned to VLAN 100 (116a), host 114b connected to port 112b may be assigned to VLAN 200 (116b) and host 114c connected to port 112c may be assigned to VLAN 300 (116c). Ports 112 on the network device 110 are thus associated with (become members of) the VLANs 116 accessible through those ports 112.

Hosts 114 on ports 112 may be assigned to VLANs 116, and ports 112 associated with VLANs 116, in any number of manners. For example, ports 112 may be associated with VLANs 116, through various dynamic configuration interfaces such as through an OpenConfig gNMI interface or through an SDK on the network device 110, or through a static configuration received through a user interface of the network device 110.

Another manner in which ports 112 may be associated with VLANs 116 at the network device 110 is through the dynamic assignment of VLANs 116 to hosts 114 on those ports 112 using an authentication framework utilized in association with the network environment 100. In particular, network device 110 can be utilized as an authenticator in network environment 100 that uses 802.1X to control access to network 120. Here, in order to gain access to network 120, hosts 114 need to be authenticated. Network device 110 serves as an authenticator in network environment 100 to authenticate these hosts 114 using an authentication server 122 (such as a RADIUS server or the like) and can control network traffic between hosts 114 and network 120 based on the result of the authentication.

Generally, during an authentication session, network device 110 sends an authentication request (e.g., an access request, etc.) to authentication server 122 when a host 114 is attempting to access network 120. That authentication server 122 can then return an authentication response (e.g., an access-accept response, access-reject, access-challenge response, etc.). To illustrate in more detail, when authenticating a host 114 (e.g., a user at the host 114b), network device 110 can generate a RADIUS Access-Request message with several properties describing that host 114 (referred to herein also as a supplicant without loss of generality). Server 122 then generates a RADIUS response (which may be a challenge). Based on the result of the authentication, host 114 may, or may not be, granted access to the network through the network interface (port) 112 on which it is connected.

This authentication framework utilized in network environment 100 may be leveraged to assign hosts 114 to VLANs. Specifically, MBVA can be used to assign VLAN memberships to hosts 114 based on their MAC addresses. MBVA allows multiple untagged traffic sources (e.g., on the same port 112) to be put on different VLANs 116.

Accordingly, the use of 802.1X in association with MBVA may allow for dynamic VLAN assignment based on authentication results. Once a host 114 successfully authenticates via 802.1X (or fails such authentication), authentication server 122 can provide instructions to network device 110 in an authentication response regarding which VLAN 116 the authenticated host 114 should be assigned to based on the MAC address of the host 144 or provided user credentials.

While the use of MBVA and VLANs in network environment 100 may provide a certain level of security, it may also be desired to implement other security measures in these contexts. One of these security measures may be the implementation of PVLANs in association with such networks. PVLANs provide an additional layer of segmentation within VLANs 116. In a traditional VLAN 116, all hosts 114 within the same VLAN 116 can communicate freely. However, in environments requiring stricter isolation, PVLANs allow further subdivision of VLANs 116 into smaller, restricted domains. PVLANs comprise a primary VLAN and one or more secondary VLANs. In a VLAN implementation these secondary VLANs may be isolated VLANs where hosts 114 cannot communicate with other devices in the same VLAN or any other VLAN, or may be community VLANs where hosts 114 on the community VLAN may communicate with other devices in the community VLAN.

Accordingly, network device 110 may allow a trunk port to behave as an access port with respect to conforming with the standards of PVLANs. In this manner, network device 110 can support PVLANs on ports 112 that are associated with multiple (e.g., untagged) VLANs 116 (e.g., when using MBVA with those ports 112). In particular, trunk ports 112a (e.g., where MBVA is being utilized) may be handled by network device 110 in the same manner (e.g., with respect to association of that port 112 with VLANs 116 in the network 120) as an access port would in cases where a device belonging to any of the configured PVLANs existed on that access port. For example, if there are multiple hosts 114 on a trunk port (e.g., 112a) with MBVA enabled, (where each of these devices may or may not belong to different VLANs in accordance with MBVA supporting multiple untagged VLANs on the port), and if any one of these hosts 114 belong to an (e.g., isolated) PVLAN, then this port 112a will conform to the PVLAN standards of behaving as an isolated port (e.g., it will not receive traffic from any other isolated or community PVLAN ports and the devices on the port will be able to communicate with other primary PVLAN ports only).

Specifically, network device 110 may promote (i.e., associate) ports 112 of network device 110 with VLANs 116 based on triggering events, such as a static or dynamic configuration change related to VLANs 116 or ports 112 associated with the network device 110. These configuration changes may include when a ports' VLAN membership changes, such as when a user interacts with an configuration interface (e.g., a command line interface) to change a configuration associated with a port's VLAN membership (e.g., changing native VLANs, VLAN assignments, creating new VLANs, deleting VLANs, etc.), when a ports' VLAN membership changes based on interaction with other interfaces such as an OpenConfig gNMI interface or an SDK provided interface on the network device 110, or when a host 114 authenticates into a port 112 dynamically via 802.1X (e.g., when a VLAN assignment is sent from an authentication server 122 or from another source).

Accordingly, when a triggering event occurs with respect to a network device (e.g., ports 112 associated with VLANs 116 thereon), the ports 112 of network device 110 may be evaluated with respect to VLANs 116 on that network device 110 to determine if any of the ports 112 should be promoted for those VLANs 116 by associating those ports 112 with those VLANs 116 such that traffic from those VLANs 116 can flow across those ports 112.

When it is determined that a triggering event has occurred for a port of the network device (e.g., wherein MBVA is enabled on the port and multiple VLANs are assigned to the port), the port can be evaluated with respect to the VLANs configured at the network device to determine if the port should be promoted with respect to any of those VLANs. The determination that a port 112 is a member of the VLAN 116 may be based on a maintained set of allowed VLANs for that port 112. Specifically, determining that port 112 is a member of the VLAN 116 may include determining that a primary VLAN of that VLAN is in the set of allowed VLANs 116 for the port 112, or that the VLAN 116 is a primary VLAN to at least one VLAN 116 in the set of allowed VLANs 116 for the port 112. When it is determined that a port 112 should be promoted may include associating the port 112 with that VLAN, indicating the port 112 is a promoted port for that VLAN 116 or determining and indicating an allowed traffic direction for that port 116 with respect to that VLAN 116.

Figure 2:
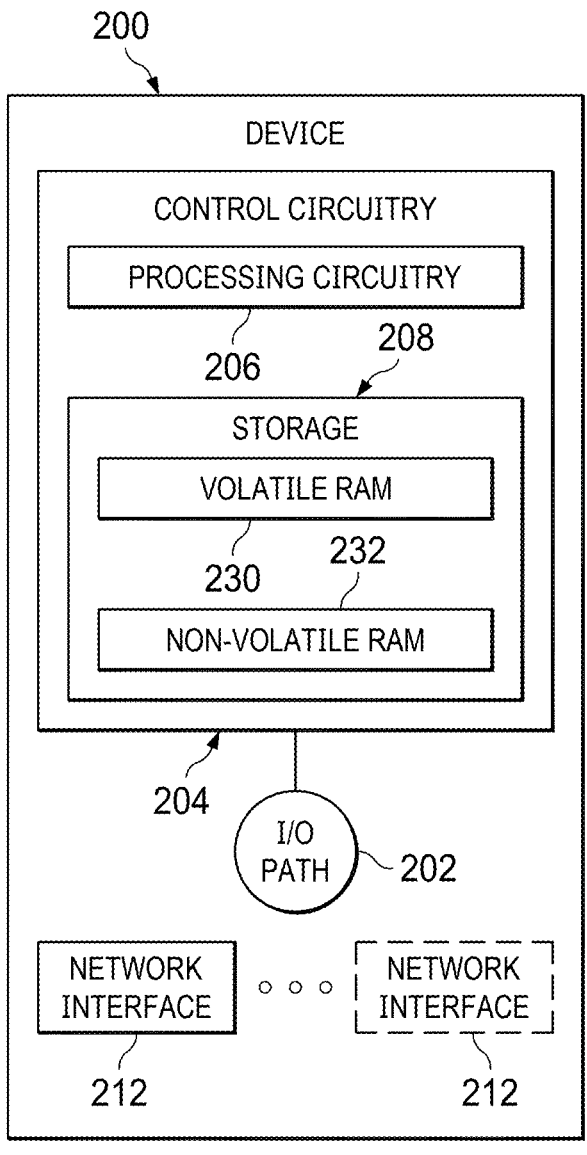
FIG. 2 is a block diagram depicting a general architecture of a network device adapted for VLAN support in accordance with an embodiment.

FIG. 2 is a block diagram depicting a general architecture of a network device for providing PVLAN support in a network environment by allowing trunk ports to behave as access ports to support PVLANs on ports that are associated with multiple VLANs. Network device 200 may be a router, switch, server, or any other computing device that may be configured to control or process network traffic. The network device 200 may receive data, including packets from hosts (not shown), via an input/output (I/O) path 202. I/O path 202 may provide packet data to control circuitry 204, which includes processing circuitry 206 and storage (i.e., memory) 208. Control circuitry 204 may send and receive commands, requests, and other suitable data using I/O path 202. I/O path 202 may connect control circuitry 204 (and specifically processing circuitry 206) to one or more network interfaces (ports) 212 to which other devices of a network (e.g., hosts) can be connected. These network interfaces 212 may be any type of network interface, such as an RJ45 ethernet port, a coaxial port, etc.

Control circuitry 204 includes processing circuitry 206 and storage 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units or multiple different processors. The circuitry described herein may execute instructions included in software running on one or more general purpose or specialized processors.

Storage 208 may be an electronic storage device that includes volatile random-access memory (RAM) 230, which does not retain its contents when power is turned off, and non-volatile RAM 232, which does retain its contents when power is turned off. As referred to herein, the phrase "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same.

According to embodiment, VLAN configuration data and port data may be stored in storage 208. This VLAN configuration data may include configured VLANs, ports 212 configured for those VLANs, whether those VLANs are primary or secondary VLANs, whether those VLANs are PVLANs, whether secondary VLANs are isolated or community VLANs or other VLAN configuration data. Additionally, to facilitate promotion of ports 212 in association with trunk ports, a list of trunk ports may be stored in storage 208 along with a list of the allowed VLANs on each of those trunk ports.

Control circuitry 204 executes instructions for port promotion based on triggering events. Specifically, when a triggering event that changes the configuration of one or more ports 212 with respect to one or more VLANs occurs with respect to network device 200, the executing instructions may evaluate the ports 212 of the network device 200 with respect to VLANs on that network device to determine if any of the ports 212 should be promoted. This evaluation may include evaluating each of the ports 212 of the network device 200 with respect to each of the VLANs configured at the device to determine if that port 212 should be promoted for that VLAN. The promotion of the port may include associating the traffic with the VLAN such that traffic from those VLANs can flow across the promoted port. For example, promoting a port 212 may include associating the port 212 with (e.g., adding it to) a floodset of a primary VLAN.

Figure 3:
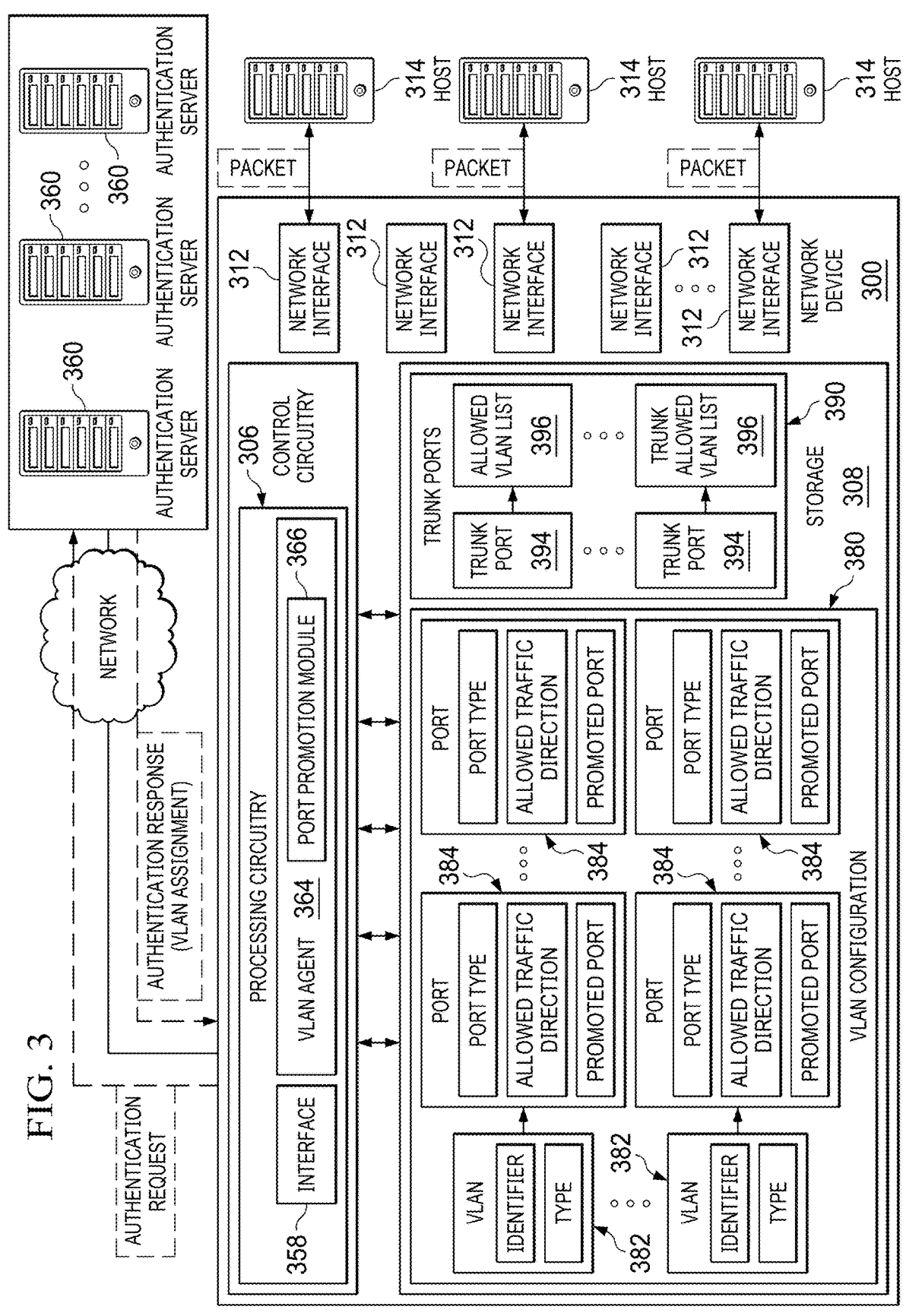
FIG. 3 is a block diagram that is a more detailed deception of a network device adapted for VLAN support in accordance with an embodiment.

FIG. 3 is a more detailed depiction of an embodiment of a network device 300 adapted to provide PVLAN support in a network environment by allowing trunk ports of the network device to behave as access ports to support PVLANs on ports that are associated with multiple VLANs. Specifically, network device 300 may include ports (network interfaces) 312 to which hosts 314 may be connected. VLANs may be defined in association with network device 300, and ports 312 associated with those VLANs, in a variety of static or dynamic manners, including interfaces 358, which may include a command line interface (CLI), an OpenConfig based gNMI interface, an interface provided by a library of an operating system of network device 300 (e.g., an SDK or the like), or in another manner. These VLANs may comprise PVLANs which may be defined in a similar manner, including the specification of primary VLANs and one or more associated secondary VLANs which may themselves be defined as isolated or community VLANs.

Additionally, hosts 314 may be associated with (e.g., placed on) VLANs defined with respect to network device 300, and ports 312 associated with those VLANs or defined as trunk ports (e.g., a port 312 for which multiple VLANs are configured), in a variety of static or dynamic manners. Again, these static or dynamic configuration mechanisms may include interfaces 358. As another mechanism for placing hosts 314 in VLANs (and thus associating the port 312 to which that host is connected with that VLAN) is MBVA (e.g., allowing multiple traffic sources on the same port 312 to be put on different VLANs). In one embodiment, for example, network device 300 may be operating as an authenticator in a network environment, including utilizing MBVA for dynamic VLAN assignment based on authentication results. A host 314 connected to a port 312 of network device 300 (and authenticating through network device 300) can thus be assigned to a VLAN by an authentication server 360 based on the MAC address of the host 314 or provided user credentials.

Accordingly, VLAN agent 364 executing on processing circuitry 306 of network device 300 may maintain data regarding these configured VLANs and ports 312 in storage 308 at the network device. This data may be created, updated, or otherwise maintained by VLAN agent 364 at the network device 300 in response to various received, changed, or updated configuration data (e.g., received through interfaces 358, from authentication server 360 or otherwise obtained). This data may be used by VLAN agent 364 or other processes on network device 300 to control, forward, or route traffic on network device 300.

In one embodiment, therefore, VLAN configuration 380 may include data for each VLAN 382 configured at network device 300. Each VLAN 382 may be associated with port data 384 for each port 312 associated with that VLAN 382. The data for each VLAN 382 may include an identifier for that VLAN (e.g., VLAN 100, etc.), and a type definition for that VLAN that may indicate whether the VLAN 382 is (e.g., part of a) VLAN, whether that VLAN is a primary or secondary VLAN, whether a secondary VLAN is an isolated or community VLAN, or other VLAN configuration data.

Port data 384 for each port 312 associated with a configured VLAN 382 may include an allowed traffic direction (allowedTrafficDirection). This allowed traffic direction signifies, for a given port 312, which direction the traffic belonging to the VLAN 382 associated with that port 312 is allowed to flow. This allowed traffic direction can have three possible values: ingress, egress, or both (ingressAndEgress). If the value is ingress, only ingress traffic is allowed for that port 312 for that VLAN 382, if the value is egress only egress traffic is allowed for that port 312 for that VLAN 382, and if the value is both traffic for that VLAN 382 may flow freely into and out of the port 312 represented by that port data 384.

Port data 384 for a port 312 associated with a VLAN 382 may also include a promoted port indicator (promotedPort). This promoted port indicator in port data 384 for a port 312 for a VLAN 382 may be a PVLAN specific attribute signifying whether the VLAN 382 is allowed on the port 312 represented by the port data 384 because that port 312 has been promoted. In other words, a promoted port indicator (or lack thereof) in port data 384 for a port 312 for a VLAN 382 may indicate whether that port 312 represented that port data 384 was promoted to a corresponding VLAN 382 or whether that port 312 inherently belonged to that VLAN 382 (e.g., was configured for, or otherwise assigned to, that VLAN).

In some cases, tag on egress data (tagOnEgress) may be part of port data 384 for a port 312 for a VLAN 382, where this attribute signifies whether traffic going out of a port 312 represented by port data 384 belonging to the associated VLAN 382 would be tagged with a VLAN tag. As certain embodiments may pertain to ports 312 on which MBVA is enabled with multiple untagged VLANs, tag on egress data may always be set to false on those ports.

VLAN agent 364 may also maintain trunk port data 390 for ports 312 on network device 300 that are defined as trunk ports. This trunk port data 390 may include port data 394 representing ports 312 of network device 300 that have been defined as trunk ports. The port data 394 representing a port 312 that is a trunk port can be associated with an allowed VLAN list (trunkAllowedVlan) 396 that includes a list of the allowed VLANs on an associated trunk port of trunk port data 394. This allowed VLAN list 396 may be populated (e.g., by VLAN agent 364) based on static or dynamic configuration of VLANs 382 on the device. An example of how this list is populated would be when a host 314 dynamically authenticates on a port 312 via 802.1X and a VLAN 382 (e.g., VLAN identifier of that VLAN 382) is received from authentication server 360. The VLAN 382 received from the authentication server 360 is added to this allowed list.

Another example of a dynamic configuration of VLANs (e.g., which may be used to create, modify, or update a allowed VLAN list), might be through various dynamic configuration interfaces 358 such as through an OpenConfig gNMI interface or by a software process on network device 300 using an SDK to directly set the state for VLANs on trunk ports. VLANs configured for various ports 312 in these ways may also be added to the allowed VLAN list 396 for those ports 312. Other ways in which an allowed VLAN list 396 for a port 312 may be populated is through a static configuration received through interface 358 such as configuring the native VLAN on a trunk port, or configuring the allowed VLAN list 396 statically in association with trunk port data 394, or almost any other manner of obtaining such information.

VLAN agent 364 includes port promotion module 366 adapted to evaluate the ports 312 of the network device 300 with respect to VLANs 382 defined on that network device 300 to determine if any of the ports should be promoted for those VLANs 382 by associating those ports 312 with those VLANs 382 such that traffic from those VLANs 382 can flow across those ports 312. Specifically, according to certain embodiments port promotion module 366 may determine when a triggering event for port evaluation has occurred.

Triggering events may be static or dynamic events such as, for example, a configuration change for a VLAN 382 received through interface 358 of network device 300, an addition of a VLAN 382 to a configuration of network device 300 (e.g., received through an interface 358 of device 300), or a change in a membership of port 312 or VLAN 382 at the network device 300. A change in membership of a port 312 of the network device 300 may be caused, for instance, by a host 314 authenticating on the port 312 and being assigned a VLAN 382 from authentication server 360.

When it is determined that a triggering event has occurred, port promotion module 366 evaluates the ports 312 of network device 300 to determine if the port 312 should be promoted with respect to any VLANs 382 defined at the network device 300. In one embodiment, therefore, port promotion module 366 may determine a set of candidate ports 312 to be evaluated for port promotion. This set of ports 312 can be, for example, a set of trunk ports represented by port data 394 in trunk port data 390 (e.g., ports 312 for which MBVA is enabled on the port 312 or where multiple VLANs are otherwise assigned to the port 312).

Port promotion module 366 can then iterate through each of the set of candidate ports 312 to determine if that port should be promoted with respect to any VLAN 382 defined at network device 300 in VLAN configuration 380. Thus, in evaluating a candidate port, port promotion module 396 can iterate through each VLAN 382 defined in VLAN configuration 380 to determine if that candidate port should be promoted with respect to that VLAN 382.

For a particular VLAN 382, when it is determined the candidate port is not (e.g., already) assigned to that VLAN 382 and that the candidate port is a member of the VLAN 382, the port may be promoted with respect to that VLAN 382. The promotion of the port 312 may include setting the promoted port indicator (promotedPort) in port data 384 for that port 312 associated with that VLAN 382 in VLAN configuration data 380. Furthermore, when that candidate port 312 is promoted, a traffic direction for the port 312 may be determined for that VLAN 382 and the determined traffic direction associated with the port 312 in port data 384 (e.g., allowedTrafficDirection) for that port 312 associated with that VLAN 382 in VLAN configuration data 380. This traffic direction may be, ingress, egress, or both and may be determined based on a type of the VLAN 382 (e.g., whether the VLAN 382 is a primary, community or isolated VLAN as defined in VLAN configuration 380).

In determining whether a candidate port is member of a (candidate) VLAN 382 may be based on a type of that VLAN 382 along with the list of VLANs on an allowed VLAN list 396 associated with port data 394 for that candidate port in trunk port data 390. In some embodiments, then, to determine if a candidate port is a member of a particular (candidate) VLAN it can be determined if a primary VLAN of the candidate VLAN is included in the allowed VLAN list 396 for the candidate port as stored in trunk port configuration data 390. The primary VLAN of the candidate VLAN can be determined by accessing VLAN configuration data 380 to determine that the candidate VLAN is a secondary VLAN and what VLAN 382 is configured as the primary VLAN for that candidate VLAN. Once the primary VLAN for the candidate VLAN is determined from the VLAN configuration data 380 it can be determined if that primary VLAN is in the allowed VLAN list 396 associated with port data 394 for that candidate port in trunk port data 390. When that primary VLAN is in the allowed VLAN list 396 for the candidate port it can be determined that the candidate port is a member of the candidate VLAN.

A candidate port can also be determined to be a member of a candidate VLAN if the candidate VLAN is a primary VLAN to at least one VLAN in the set of allowed VLANs for the candidate port. According to one embodiment to make such a determination, the allowed VLAN list 396 associated with port data 394 for the candidate port may be accessed in trunk port data 390 to determine the VLANs 382 on the allowed VLAN list 396 for the candidate port. VLAN configuration data 380 can then be accessed to determine if the candidate VLAN is the primary VLAN to any of the VLANs determined from the allowed VLAN list 396 associated with the candidate port. When the candidate VLAN is the primary VLAN for any VLANs on the allowed VLAN list 396 associated with the candidate port, it can be determined that the candidate port is a member of the candidate VLAN.

Figure 4:
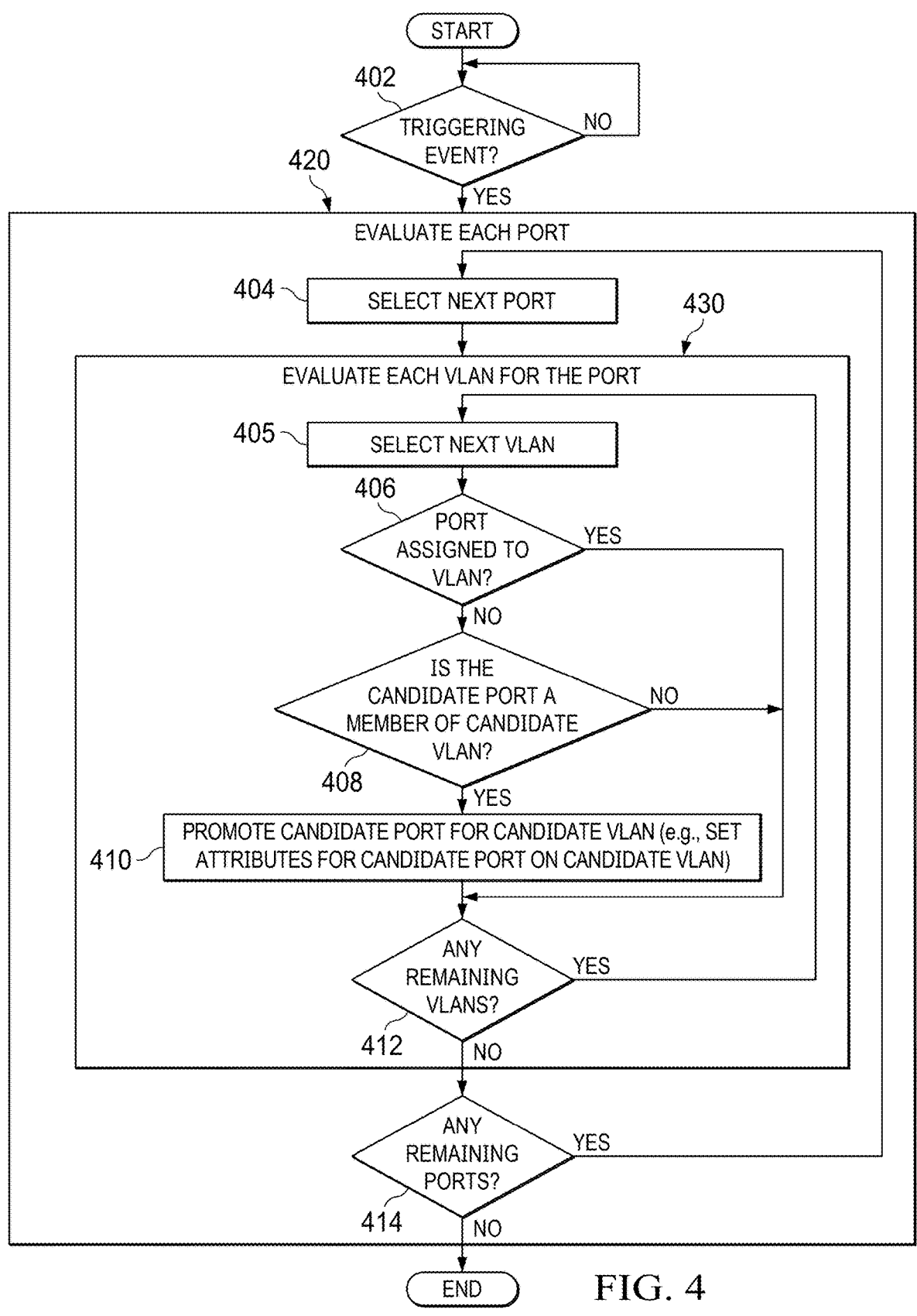
FIG. 4 is a flow diagram of one embodiment of a method for port promotion for VLAN support at a network device.

FIG. 4 depicts one embodiment of a method for port promotion on a network device. Initially it can be determined that a triggering event for port evaluation has occurred (Y Branch of STEP 402). These triggering events may be static or dynamic events such as, for example, a configuration change for a VLAN or a change in a membership of a port 312 or VLAN such as when a host is assigned a VLAN by an authentication server using MBVA.

When it is determined that a triggering event has occurred, each of a set of candidate ports of the network device (which may be all ports or a subset of ports of the network device) may be evaluated to determine if that port should be promoted with respect to any VLANs defined at the network device (STEP 420). The evaluation of the set of candidate ports starts with a selection of one of the candidate ports (STEP 404). The selected candidate port can then be evaluated against candidate VLANs defined on the network device (STEP 430). The evaluation of the candidate VLANs starts with a selection of one of the candidate VLANs (STEP 405). If the candidate port is already assigned to the VLAN (Y Branch of STEP 406) it can be determined if any more candidate VLANs remain (STEP 412) and, if so, (Y Branch of STEP 412), the next candidate VLAN may be selected for evaluation against the candidate port (STEP 405).

If the candidate port is not assigned to the VLAN (N Branch of STEP 406) it can be determined if the candidate port is a member of the candidate VLAN (STEP 408). When the candidate port is a member of the candidate VLAN (Y Branch of STEP 408) the candidate port may be promoted with respect to that candidate VLAN (STEP 410). The promotion of the port may include setting one or more attributes for that candidate port with respect to that candidate VLAN. For example, a promoted port indicator for that candidate port associated with that candidate VLAN may be set in VLAN configuration data. Furthermore, a traffic direction for the candidate port may be determined for that candidate VLAN and the determined traffic direction associated with the candidate port in association with the candidate VLAN in VLAN configuration data.

It can then be determined if any more candidate VLANs remain (STEP 412) and, if so, (Y Branch of STEP 412), the next candidate VLAN may be selected for evaluation against the candidate port (STEP 405). If there are no more remaining candidate VLANs (N Branch of STEP 412), it can be determined if there are any more candidate ports to evaluate (STEP 414). If there are more candidate ports to evaluate for port promotion (Y Branch of STEP 412), the next candidate port may be selected and evaluated (STEP 404), otherwise the evaluation of ports for promotion may end (N Branch of STEP 414).

Figure 5:
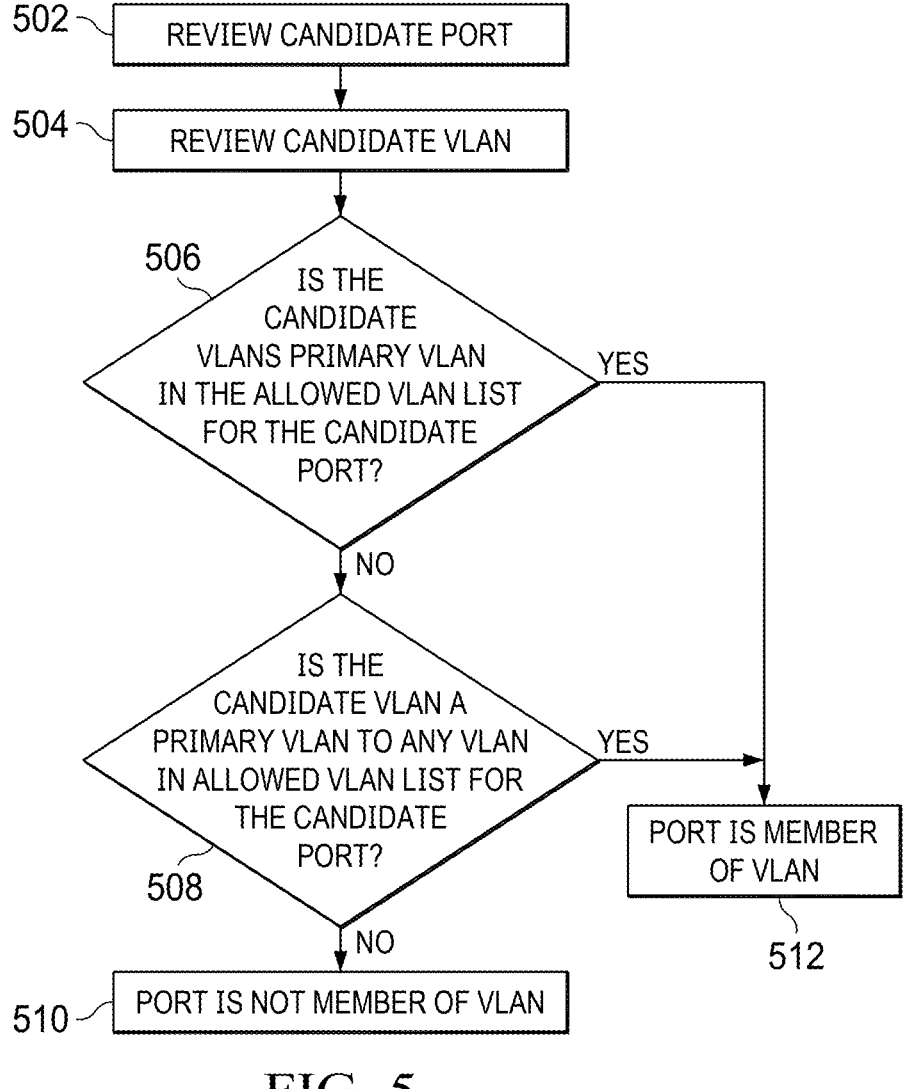
FIG. 5 is a flow diagram of one embodiment of a method for determining port membership in a VLAN.

Referring then to FIG. 5, one embodiment of a method for determining if a (candidate) port is a member of a (candidate) VLAN is depicted. Here, a candidate port to evaluate against a candidate VLAN may be received (STEPS 502, 504). It can then be determined if a primary VLAN of the received candidate VLAN is included in an allowed VLAN list for the candidate port (STEP 506). When that primary VLAN is in the allowed VLAN list for the candidate port it can be determined that the candidate port is a member of the candidate VLAN (Y Branch of STEP 506 and STEP 512).

If the primary VLAN of the candidate VLAN is not in the allowed VLAN list for the candidate port (N Branch of STEP 506), it can be determined if the candidate VLAN is a primary VLAN to at least one VLAN in the set of allowed VLANs for the candidate port (STEP 508). When the candidate VLAN is the primary VLAN for any VLANs on the allowed VLAN list 396 associated with the candidate port (Y Branch of STEP 508), it can be determined that the candidate port is a member of the candidate VLAN (STEP 512) otherwise (N Branch of STEP 508) it can be determined that candidate port if not a member of the candidate VLAN (STEP 510).

It may now be useful to illustrate an example of port promotion on a network device. Suppose a network device is configured with the following VLANs: VLAN 100 as a primary PVLAN, VLAN 200 as an isolated PVLAN with its primary VLAN being VLAN 100, and VLAN 300 as a community PVLAN with its primary VLAN being VLAN 100.

Further suppose that there are three ports (network interfaces) where MBVA has been enabled, (e.g., all these interfaces are trunk ports that may support multiple (e.g., untagged) VLANs). These ports may be Ethernet1 (Et1), Ethernet2 (Et2) and Ethernet3 (Et3). For this example assume Ethernet1 has a host which has authenticated with an authentication server returning VLAN 100 for that host (in other words, Ethernet1 is a primary PVLAN port). Assume further that Ethernet2 has a host which has authenticated with an authentication server returning VLAN 200 for that host (thus Ethernet2 is a secondary isolated PVLAN port) and that Ethernet3 has a host which has authenticated with an authentication server returning VLAN 300 for that host (thus Ethernet3 is a secondary community PVLAN port).

So, assuming the above scenario, the following state of the confirmation on a network device may be:

Configured *VLANs* on the switch = {100, 200, 300}

For *VLAN* 100–*Ethernet*1 has the following attributes: *promotedPort* =

False and *allowedTrafficDirection* = *ingressandEgress*

For *VLAN* 200–*Ethernet*2 has the following attributes: *promotedPort* =

False and *allowedTrafficDirection* = ingress (as isolated *VLANs* can't receive traffic from other isolated *VLAN* ports, only ingress traffic is allowed)

For *VLAN* 300–*Ethernet*3 has the following attributes: *promotedPort* =

False and *allowedTrafficDirection* = ingressandEgress (as *VLAN* 300 is a secondary community *VLAN*)

Ethernet1's *trunkAllowedVlan* list = {100}

Ethernet2's *trunkAllowedVlan* list = {200}

Ethernet3's *trunkAllowedVlan* list = {300}

Now assume a triggering event occurs on the network device configured in this manner. For example, a new VLAN may be configured on the network device, a configuration change is made on the network device in association with a PVLAN (e.g., a primary to secondary PVLAN mapping), a port's VLAN membership changes (e.g., statically through an interface or dynamically through an interface or device authentication on a port and corresponding VLAN assignment). In this case, each port (Ethernet1, Ethernet2 and Ethernet 3) will be evaluated for port promotion, where each port is evaluated with respect to each VLAN (100, 200, 300).

Accordingly, port Ethernet1 is evaluated for port promotion against all three VLANs (100, 200, 300). When Ethernet1 is evaluated against VLAN 100 it can be determined that the port Ethernet1 is already a member of VLAN 100 and has the following attributes: promotedPort=False and allowedTrafficDirection=ingressAndEgress.

When Ethernet1 is evaluated against VLAN 200 it can be determined that VLAN 200 is not assigned to Ethernet1, hence a determination whether Ethernet1 is a member of VLAN 200 can be made. When making this determination it can be determined that VLAN 200's primary PVLAN is VLAN 100 which is indeed in the trunkAllowedVlan list for Ethernet1, hence VLAN 200 should be allowed on port Ethernet1 and Ethernet1 should be promoted with respect to VLAN 200. Thus, the attributes for Ethernet1 with respect to VLAN 200 may be set as promotedPort=True and allowedTrafficDirection=Egress (because secondary traffic should only be allowed to egress out of a primary PVLAN port (e.g., Ethernet1)).

When Ethernet1 is evaluated against VLAN 300 it can be determined that VLAN 300 is not assigned to Ethernet1, hence a determination whether Ethernet1 is a member of VLAN 300 can be made. When making this determination it can be determined that VLAN 300's primary PVLAN is VLAN 100 which is in the trunkAllowedVlan list for Ethernet1, hence VLAN 300 should be allowed on port Ethernet1 and Ethernet1 should be promoted with respect to VLAN 300. Thus, the attributes for Ethernet1 with respect to VLAN 300 may be set as promotedPort=True and allowedTrafficDirection=Egress (because secondary traffic should only be allowed to egress out of a primary PVLAN port (e.g., Ethernet1)).

Similarly, port Ethernet2 may be evaluated with respect to each VLAN (100, 200 and 300) to determine if Ethernet2 should be promoted with respect to any of those VLANs. When Ethernet2 is evaluated against VLAN 100 it can be determined that VLAN 100 is not assigned to Ethernet2, hence a determination whether Ethernet2 is a member of VLAN 100 can be made. When making this determination it can be determined that VLAN 200 is in the trunkAllowedVlan list for Ethernet2 and VLAN 200's primary PVLAN (VLAN 100) is the VLAN that is currently being evaluated (the candidate VLAN), thus Ethernet2 is a member of VLAN 100 and should be promoted with respect to VLAN 100. Accordingly, the attributes for Ethernet2 with respect to VLAN 100 may be set as promotedPort=True and allowedTrafficDirection=Egress (because primary traffic should only be allowed to egress out of a secondary PVLAN port (e.g., Ethernet2)).

When Ethernet2 is evaluated against VLAN 200 it can be determined that the port Ethernet2 is already a member of VLAN 200 and has the following attributes: promotedPort=False and allowedTrafficDirection=ingress.

When Ethernet2 is evaluated against VLAN 300 it can be determined that VLAN 300 is not assigned to Ethernet2, hence a determination whether Ethernet2 is a member of VLAN 300 can be made. When making this determination it can be determined that VLAN 300's primary VLAN (VLAN 100) is not in the trunkAllowedVlan list for Ethernet2, nor is VLAN 300 a primary PVLAN to any of the VLANs in the trunkAllowedVlan list for Ethernet2. As such, Ethernet2 is not a member of VLAN 300 and does not need to be promoted with respect to VLAN 300.

The evaluation of Ethernet3 with respect to VLANs 100, 200 and 300 may be understood as similar to the evaluation of Ethernet1 and Ethernet2 as described.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method, comprising:
determining a triggering event associated with a port of a network device, wherein MAC-based VLAN assignment (MBVA) is enabled on the port and multiple VLANs are assigned to the port, wherein MBVA is enabled to assign VLAN membership to host devices based on MAC addresses of the host devices;
In response to this triggering event:
for a VLAN configured at the network device:
determining that the port is not assigned to that VLAN;
determining the port is a member of the VLAN based on a set of allowed VLANs for the port; and
promoting the port to associate the port with the VLAN and allowing traffic of that VLAN on that port.

2. The method of claim 1, wherein promoting the port comprises determining a traffic direction for the port for the VLAN, and associating the traffic direction with the port and that VLAN.

3. The method of claim 2, wherein the traffic direction is determined based on a type of the VLAN.

4. The method of claim 3, wherein the type of the VLAN is a primary, community, or isolated VLAN.

5. The method of claim 2, wherein promoting the port comprises setting a promoted port indicator with respect to the port and the VLAN.

6. The method of claim 1, wherein determining that the port is a member of the VLAN comprises determining that a primary VLAN of the VLAN is in the set of allowed VLANs for the port.

7. The method of claim 1, wherein determining that the port is a member of that VLAN comprises determining that the VLAN is a primary VLAN to at least one VLAN in the set of allowed VLANs for the port.

8. The method of claim 1, wherein the triggering event is a static or dynamic event.

9. The method of claim 8, wherein the triggering event is a configuration change for the VLAN received through an interface of the network device, an addition of the VLAN to a configuration of the network device, or a change in a membership of the port or the VLAN at the network device.

10. The method of claim 9, wherein the change in the membership of the port is caused by a device authenticating on the port and being assigned to the VLAN from an authentication server.

11. The method of claim 9, wherein the change in membership of the port is caused by a configuration change received through an interface of the network device.

12. The method of claim 11, wherein the interface is a gNMI based interface.

13. The method of claim 1, wherein the multiple VLANs include at least one private VLAN.

14. A network device, comprising:
a processor;
a set of ports including a trunk port, wherein host devices on the trunk port are assigned VLAN membership based on MAC addresses of the host devices;
a non-transitory computer readable medium, comprising instructions for the processor for:
determining an occurrence of a triggering event associated with the trunk port;
In response to the triggering event:
for a VLAN configured at the network device:
determining that the trunk port is not assigned to that VLAN;
determining the trunk port is a member of the VLAN based on a set of allowed VLANs for the trunk port; and
promoting the trunk port to associate the trunk port with the VLAN and allow traffic of that VLAN on that trunk port.

15. The network device of claim 14, wherein MAC-based VLAN assignment (MBVA) is enabled on the trunk port.

16. The network device of claim 15, wherein the triggering event is a device authenticating on the trunk port and being assigned to the VLAN from an authentication server.

17. The network device of claim 14, wherein promoting the trunk port comprises determining a traffic direction for the trunk port for the VLAN based on a type of the VLAN and associating the traffic direction with the trunk port and that VLAN.

18. The network device of claim 14, wherein determining that the trunk port is a member of the VLAN comprises determining that a primary VLAN of the VLAN is in the set of allowed VLANs for the trunk port or that the VLAN is a primary VLAN to at least one VLAN in the set of allowed VLANs for the trunk port.

19. The network device of claim 14, wherein the triggering event is a configuration change for the VLAN received through an interface of the network device, an addition of the VLAN to a configuration of the network device, a change in a membership of the trunk port or the VLAN at the network device or a device authenticating on the trunk port and being assigned to the VLAN from an authentication server.

20. A non-transitory computer readable medium, comprising instructions for:
determining a triggering event associated with a port of a network device, wherein MAC-based VLAN assignment (MBVA) is enabled on the port and multiple VLANs are assigned to the port;
In response to this triggering event:
for a VLAN configured at the network device:
determining that the port is not assigned to that VLAN;
determining the port is a member of the VLAN based on a set of allowed VLANs for the port by determining that a primary VLAN of the VLAN is in the set of allowed VLANs for the port or that the VLAN is the primary VLAN to at least one VLAN in the set of allowed VLANs for the port; and promoting the port to associate the port with the VLAN and allowing traffic of that VLAN on that port by determining a traffic direction for a trunk port for the VLAN based on a type of the VLAN and associating the traffic direction with the trunk port and that VLAN.

\* \* \* \* \*